United States Patent
Cundall

(10) Patent No.: US 12,041,118 B2
(45) Date of Patent: *Jul. 16, 2024

(54) LINKED FILE ENGAGEMENT

(71) Applicant: Microsoft Technology Licensing, LLC, Redmond, WA (US)

(72) Inventor: Samuel Robert Cundall, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,486

(22) Filed: Jul. 7, 2023

(65) Prior Publication Data

US 2023/0353628 A1 Nov. 2, 2023

Related U.S. Application Data

(63) Continuation of application No. 17/525,709, filed on Nov. 12, 2021, now Pat. No. 11,743,321.

(51) Int. Cl.
*H04L 67/06* (2022.01)
*H04L 12/18* (2006.01)
*H04L 67/104* (2022.01)

(52) U.S. Cl.
CPC .......... *H04L 67/06* (2013.01); *H04L 12/1822* (2013.01); *H04L 12/1831* (2013.01); *H04L 67/1044* (2013.01)

(58) Field of Classification Search
CPC ...................................................... H04L 67/06
See application file for complete search history.

(56) References Cited

U.S. PATENT DOCUMENTS

| | | | |
|---|---|---|---|
| 10,693,956 B1* | 6/2020 | Green | H04L 63/0428 |
| 2007/0233878 A1 | 10/2007 | Kaarela et al. | |
| 2011/0151838 A1 | 6/2011 | Olincy et al. | |
| 2014/0057610 A1 | 2/2014 | Olincy et al. | |
| 2015/0163311 A1* | 6/2015 | Heath | G06Q 50/01 709/204 |
| 2018/0315084 A1* | 11/2018 | Savage | G06N 5/022 |
| 2019/0394507 A1* | 12/2019 | Hardee | H04N 21/2187 |
| 2020/0285351 A1* | 9/2020 | Tang | G06T 13/00 |
| 2020/0329005 A1* | 10/2020 | Anerella | H04L 51/224 |
| 2021/0368005 A1* | 11/2021 | Brevoort | H04L 65/1083 |

OTHER PUBLICATIONS

"Non-Final Office Action Issued in U.S. Appl. No. 18/131,865", Mailed Date: Nov. 9, 2023, 8 Pages.

* cited by examiner

*Primary Examiner* — Glenford J Madamba
*Assistant Examiner* — Abderrahmen Chouat
(74) *Attorney, Agent, or Firm* — Schwegman Lundberg & Woessner, P.A.

(57) ABSTRACT

Disclosed in some examples are methods, systems, machine-readable mediums, and devices for providing an aggregated view of reactions to content across multiple sharing locations of a network-based content sharing service and in some examples across multiple sharing locations of multiple network-based content sharing services. The system may track or determine reactions across different sharing locations of a single content sharing service (such as a unified communication service) or across multiple services. In some examples, only reactions to the content that are from sharing locations accessible by a particular user are aggregated and displayed to the particular user. In other examples, reactions may be viewable from all sources regardless of access by a user.

20 Claims, 10 Drawing Sheets

| | | SEARCH OR TYPE A COMMAND | | |
|---|---|---|---|---|
| FILES | | | | |
| VIEWS | RECENT | | | |
| ⏲ RECENT | TYPE | NAME | MODIFIED | LOCATION |
| ▦ TEAMS | ⊠ | TRACKING SHEET.XLSX  △2 ♡2 ✉3 —940, 945 | 4H AGO | JIM'S ONEDRIVE |
| CLOUD STORAGE | 📄 | PROJECT X.DOCX  ☺1 ☻4 ♡2 ☺1 —950 | 4H AGO | LESLIE'S ONEDRIVE |
| ☁ CLOUD DRIVE | 📄 | PROJECT Y.DOCX  ☺1 ♡2 | 4H AGO | TEAM 1 CHANNEL 1 POST |
| | 📄 | INVENTORY.XLSX | 4/12/2021 | JIM'S ONEDRIVE |
| | 📄 | PRESENTATION.PPTX | 3/22/2021 | JIM'S ONEDRIVE |
| | 📄 | PROJECT A. DOCX | 1/17/2020 | REBECCA'S ONEDRIVE |

ACTIVITY · CHAT · MEETINGS · CALLS · FILES · ··· · STORE · FEEDBACK

900

LINKED FILE ENGAGEMENT

CROSS-REFERENCE TO RELATED APPLICATIONS

This application is a continuation of prior U.S. application Ser. No. 17/525,709, filed on Nov. 12, 2021, which is incorporated by reference herein in its entirety.

TECHNICAL FIELD

Embodiments pertain to engagement. Some embodiments relate to presenting a unified view of content engagement such as presenting reactions to content.

BACKGROUND

Content may be a document, video, message, text, photos, animations, or a combination thereof. Content containers may store content in a structured format. Example containers may include a file, database, and the like. Containers may be stored in one or more storage devices across one or more locations. Content in containers may be associated with one or more other content items, containers, conversations, or media.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates a GUI where a user has activated a menu to display additional reaction information according to some examples of the present disclosure.

FIG. 9 illustrates a diagram of a GUI of a communication service according to some examples of the present disclosure.

DETAILED DESCRIPTION

Figure 1:
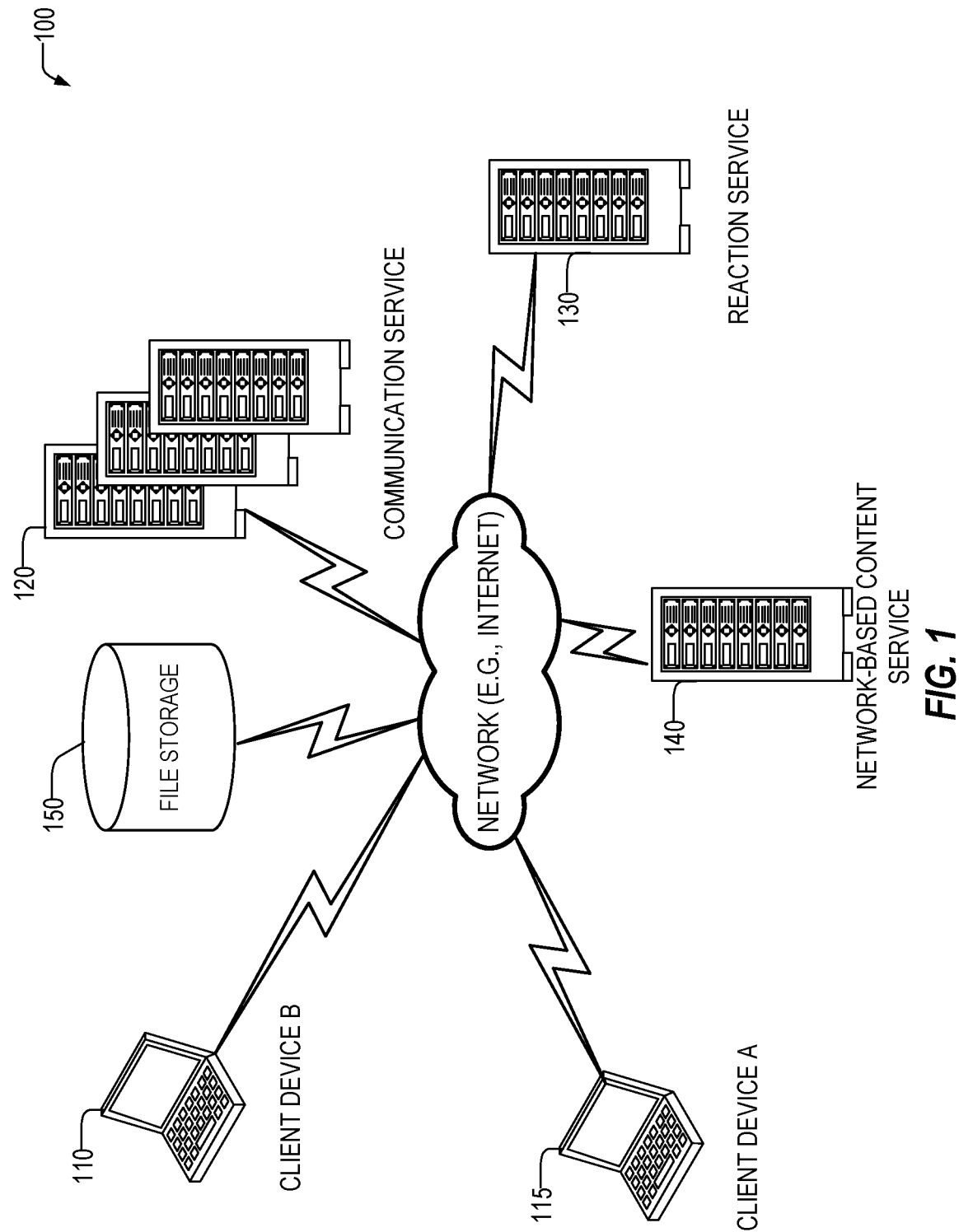
FIG. 1 illustrates an environment of content reaction aggregation according to some examples of the present disclosure.

Content sharing capabilities have expanded to allow content to be shared with a variety of users within and across a variety of services and platforms. For example, content may be shared within a unified communication service, such that a same item of content is shared in multiple different conversation threads, voice calls, and other sharing locations in the unified communication service. In addition, content may be shared across services. For example, a same content container (e.g., a file) may be shared in both a first network-based content sharing service (e.g., a file sharing service) and a second network-based content sharing service (e.g., a unified communication service).

Recent innovations have allowed users to provide reactions to content. Reactions are selected by users from a predetermined list of reaction types. These reactions may be graphically represented by defined icons, emojis, animations, video clips, or the like. Example reaction types include approval—represented by a thumbs up icon; an angry reaction represented by an angry face icon; an astonished reaction represented by an astonished face icon; a love reaction represented by a heart; and other prespecified reactions. These reactions indicate an opinion on the content of the user leaving the reaction. These are typically selected by a user in a graphical user interface (GUI) of a network-based content sharing service. A reaction is defined as the specific instance of a user selecting a reaction type from the predetermined list—often by selecting the graphical representation of the reaction type. The reactions corresponding to each reaction type are then displayed for users authorized to view the content. A network-based content sharing service may be any network-based service that allows for sharing content between users. Examples include unified communication services, file sharing services, and the like.

The reactions left to content in a first sharing location, such as a group, channel, thread, or the like of a network-based content sharing service are typically stored in that location and the GUI of the network-based content sharing service will only show those reactions when the user navigates to that location. Additionally, when the user navigates to that location, only those reactions left in that location are shown—reactions from other sharing locations are not shown. Finally, the reactions viewable in one network-based content sharing service are typically only the reactions left by users of that service within that service. In sum, the reactions viewable to users at a particular sharing location are local to the sharing location where the reactions were left. While this may be a desired outcome—that is, users may want to see only what other users in a particular group or thread think about content; it may also be desirable to find out how a larger group of content consumers view the content by providing an aggregation of a larger group of reactions across sharing locations within the network-based content sharing service and in some examples even across multiple network-based content sharing services.

Disclosed in some examples are methods, systems, machine-readable mediums, and devices for providing an aggregated view of reactions to content across multiple sharing locations of a network-based content sharing service and in some examples across multiple sharing locations of multiple network-based content sharing services. The system may track or determine reactions across different sharing locations of a single content sharing service (such as a unified communication service) or across multiple services. In some examples, only reactions to the content that are from sharing locations accessible by a particular user are aggregated and displayed to the particular user. In other examples, reactions may be viewable from all sources regardless of access by a user.

Previous solutions required users to navigate to each possible sharing location to identify locations where one or more content containers were shared and determine the reaction types and numbers of reactions. The user must then manually aggregate the reactions by type across all sharing locations. This wastes network resources as it requires network traffic, processing time, and electrical power to search for, view, and aggregate reactions across sharing locations for every user who wishes to view the aggregated reactions. It is also error prone and risks users missing sharing locations or miscounting reactions. These technical problems are solved with the technical solutions of providing an automatic aggregated view of reactions to a piece of content. For example, by use of an aggregation process or service, reactions from a variety of sharing locations may be reported to a central location that may then store each reaction and report the reactions to interested parties. In other examples, even by utilizing an aggregation service that does not track aggregated reactions, but instead searches for content shared in sharing locations, the use of lightweight APIs instead of loading of GUIs of the sharing locations of the network-based sharing service increases speed and reduces network resources. Thus, these solutions reduce power usage, processing resource usage, and network resource usage associated with the manual aggregation process.

FIG. 1 illustrates an environment 100 of content reaction aggregation according to some examples of the present disclosure. Client computing devices 110 and 115 may be members of, and browse content associated with various network-based content sharing services. Network-based content sharing services may be any network-based service that provides the ability to share content and provide reactions. Examples of network-based content sharing services may include a communication service (such as communication service 120), file sharing services, cloud-based file sharing services, database services, web-based collaboration platforms, document management services, and the like. Client device A 115 and client device B 110 may access the network-based content service 140 and/or the communication service 120 using one or more applications, such as a dedicated application for the network-based content service 140 and/or the communication service 120 or using one or more browsers.

Communication service 120 may be a unified communication service. In some examples, a unified communication service provides multiple communication modalities in a single communication service. Content may be shared within one or more of these modalities. Modalities may be communication modes. Example modalities may include chat messaging; meetings; voice and video calling; file sharing; and the like. In some examples, different sharing locations may provide different communication modalities. For example, a meeting or voice call modality may provide video, voice calling, chatting, screen sharing, and the like. In contrast a chat room may provide text chatting only.

The communications modalities and the content shared in unified communication services may be organized using a number of different configurations. In some examples, the network-based content sharing service may have a hierarchical organization of content. For example, a top-level may be a "group" that may organize content related to teams of people, projects, certain topics, or the like. Groups may be further divided into one or more subgroups that may be called various terms such as channels, topics, and the like. These subgroups may then be further subdivided, for example, into communication threads. Communication threads may organize communications that groups content and communications related to a particular conversation.

Each level of organization may include content such as shared files, meetings, or the like. That is, a group may have content associated with the entire group. Subgroups of the group may have content associated with the particular subgroup, and so on. Thus, each level of the organization may be a content sharing location. In addition, within each group or subgroup, different communication modalities may be present. For example, a first subgroup may have a first communication modality and a second subgroup may have a second communication modality. Furthermore, each group or subgroup may include one or more different types of content. In some examples, communication services may allow sharing a same content within multiple subgroups in a single group, or even within multiple groups. In addition, the communication services may allow for leaving reactions to content shared within a group or subgroup using a GUI that displays content associated with the group or subgroup.

The network-based content sharing services (e.g., communication service 120 and/or network-based content service 140) may be facilitated by one or more servers and one or more client applications. The client applications communicate with the servers to receive user interfaces, content, and other services offered by the network-based service. For example, for a communication service, the client applications may communicate with the servers to provide communication capabilities such as voice calls, texts, and the like. As noted, servers may be utilized to provide network-based content sharing services such as network-based content sharing service 140. In other examples, content sharing may utilize peer-to-peer communications. Applications may include a browser-based application or a dedicated application.

In some examples, reaction service 130 may track or determine reactions for various content in content containers (e.g., the files) within various content sharing locations of communication service 120 and in some examples, across both the communication service 120 and the network-based content sharing service 140. In some examples, the reaction service 130 utilizes packet-based communications and associated protocols along with an Application Programming Interface (API) of the communication service 120 and the network-based content sharing service 140 to identify content, and to track reactions to that content across multiple sharing locations. For example, when an aggregated reaction for a particular content container is requested, the reaction service 130 may identify applicable content sharing locations in the communication service 120 and/or the network-based content sharing service 140 and may determine if the particular content container is shared within one of the applicable sharing locations and if so, the reactions left for the content container. Applicable content sharing locations may include content sharing locations accessible by a particular user (e.g., the user requesting to view the aggregated reactions), particular content sharing locations (e.g., a particular group or subgroup), all content sharing locations of a particular content sharing service, all content sharing locations known to the reaction service 130, and the like.

In other examples, the reaction service 130 may subscribe, using an API, to receive notifications of updates about content shared, reactions left, and the like for one or more applicable content sharing locations of one or more network-based content sharing services (e.g., communication service 120 and/or network-based content sharing service 140). In these examples, the reaction service 130 may store information received from the network-based content sharing services about content shared, reactions left, and/or the like in sharing locations. The amount of information obtained may depend what information is exposed by the API of the network-based content sharing service. In these examples, when aggregating the reactions, the system may utilize the information obtained through these notifications and may request other information not provided through a notification either periodically or when asked to generate an aggregated view of the reactions. For example, if the network-based content sharing service exposes both what content is shared and the reactions to that shared content, the reaction service 130 may store this information and may increment a reaction of a particular type each time a notification is received by the reaction service (e.g., in a data store). When the aggregated reaction information is requested, the reaction service simply retrieves the aggregated reactions from a data store of the reaction service where the notifications were saved. In other examples, where reaction notifications are not provided by the API, but notifications indicating which content is shared in which groups and subgroups, the system may quickly identify, for a particular item of content, which groups or subgroups to request reactions from. The reactions may be requested then from the API, or the reaction service may scrape the GUI of the network-based content sharing service to obtain the reaction information.

In still other examples, the network-based content sharing service may, upon receiving a reaction from the user, update a database of reactions. This database may be separate reaction database or may be updated in metadata of the file. This metadata or database may be a centralized databased available to all sharing locations of the network-based content sharing services for which reactions are aggregated. In some examples, the metadata or database may be stored in content storage 150.

While a communication service 120 is shown, the reaction service 130 may track reactions across other network-based content sharing services, such as network-based content sharing service 140 and another network-based content sharing service. Additionally, while the reaction service 130 is shown as a separate component in FIG. 1, in other examples, the reaction service 130 may be part of the communication service 120, the network-based content service 140, or the like.

In some examples, the content containers are stored in a centralized location such as content storage 150. For example, the communication service 120 or network-based content sharing service 140 may not store the content containers for content associated with the various communication threads or the service, but may instead, have pointers to the content containers on the content storage 150. A single copy of the content may be stored for each shared location, or multiple copies may be stored—one for each shared location on the communication service 120 and network-based content sharing service 140. Having multiple copies may allow for changes made in one sharing location to persist only at that location and not affect other locations. In examples in which multiple copies of the content container is stored, a fingerprint of the content container may be used to correlate instances of the content container across multiple sharing locations.

Figure 2:
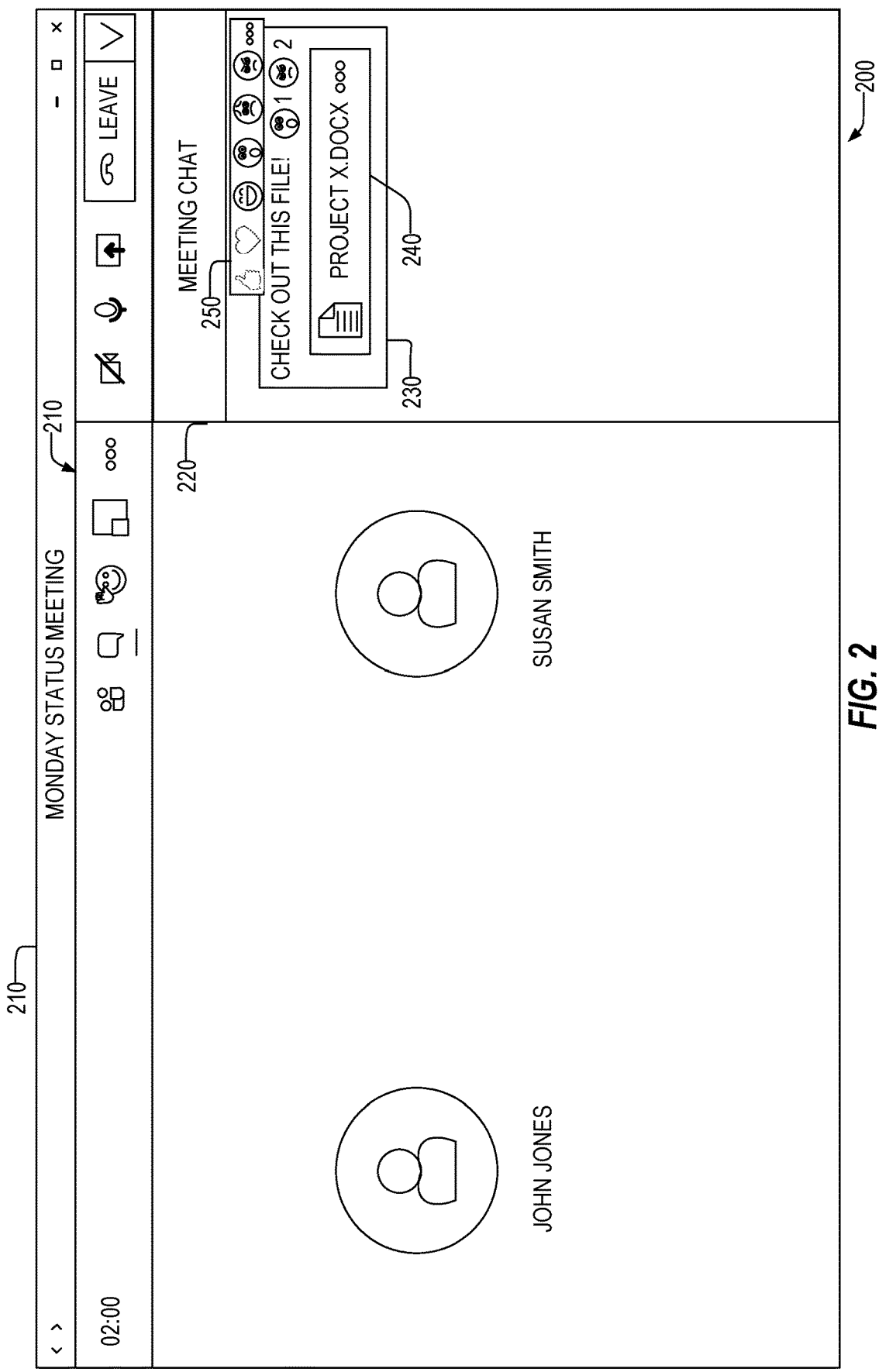
FIG. 2 illustrates a diagram of a Graphical User Interface (GUI) of a communication service according to some examples of the present disclosure.

FIG. 2 illustrates a diagram of a Graphical User Interface (GUI) 200 of a communication service according to some examples of the present disclosure. The GUI 200 is of a communication service during an online meeting. Meeting functions bar 210 allows users to select one or more meeting functions, including a function for a meeting chat. Selection of the meeting chat function (shown selected based upon the line underneath the chat bubble icon) shows the meeting chat window 220. Meeting chat window 220 allows users to chat in a text form to one or more other users during the meeting. Chats may be to all users and be visible by all users or may be only to select groups. Chat message 230 stating to "check out this file!" was sent by a user within the meeting to one or more other users. The chat message shared a file "project x.docx".

Users may provide a specified input to trigger reactions dialog 250 to select a reaction type to leave a reaction to the file. For example, the user may hover over or otherwise select the file in the meeting chat window to activate reactions dialog 250 where users may select icons corresponding to reaction types. In the example of reactions dialog 250, reactions may include a thumbs-up (signifying approval); a heart (signifying that the user "loves" the content); a smiley face (indicating that the content causes the user joy); a shocked face (indicating that the content causes the user apprehension); a frowny face emoji (indicating that the content causes the user displeasure); and a mad face emoji (indicating that the content causes the user to be angry). Also shown in the chat bubble 230 are the emojis of reactions that users have already left for the file and the number of each reaction. In the case of "project x.docx", users have left one apprehensive reaction and two displeasure reactions. As previously described, these reactions would not typically be shown in a different sharing location of the communication system for the same content and would not be aggregated with reactions to the same content in other GUIs for other organizational units such as groups, channels, threads, or the like on the communication system or other organizational units generally for content sharing services.

Figure 3:
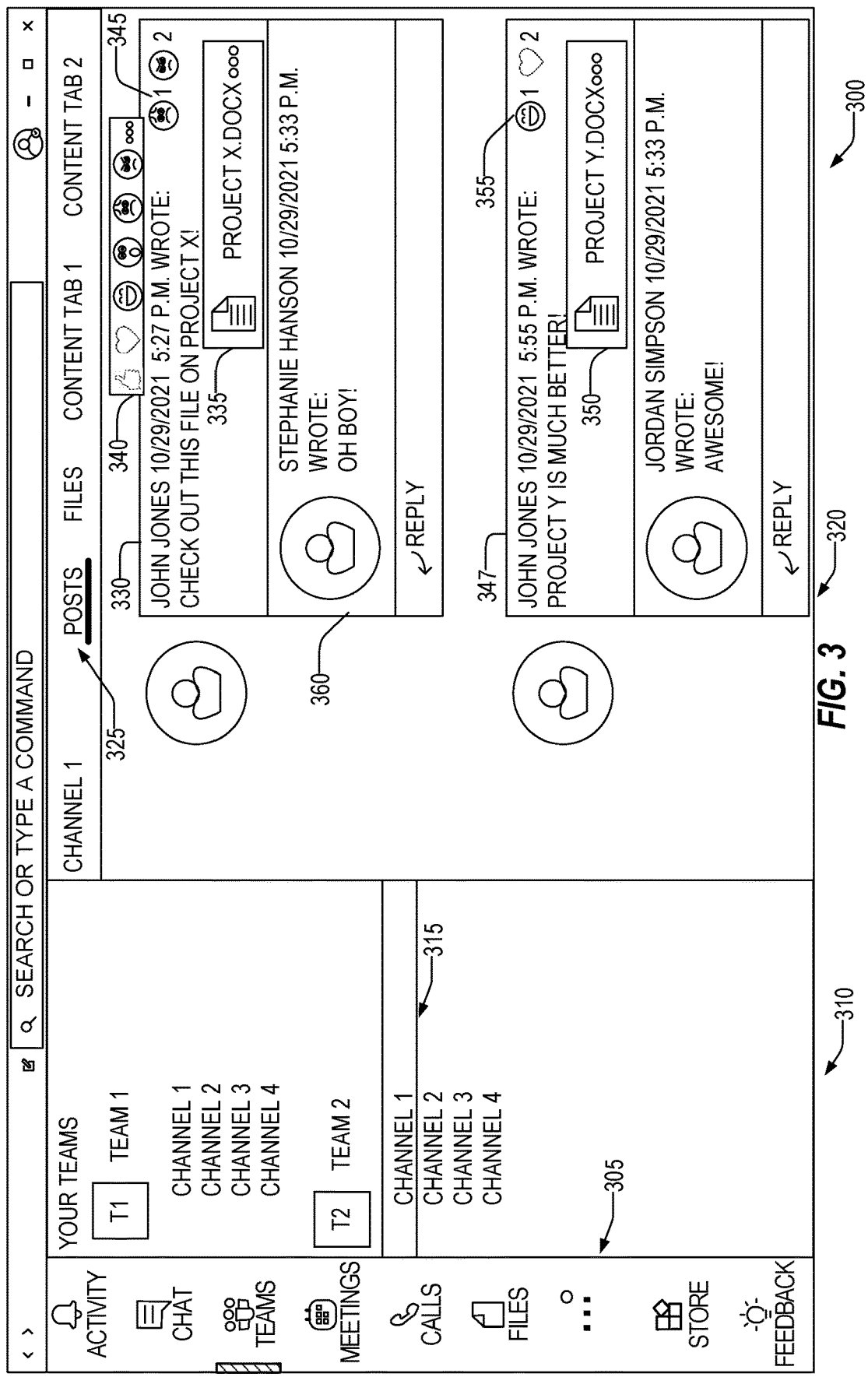
FIG. 3 illustrates a diagram of a GUI of a communication service according to some examples of the present disclosure.

FIG. 3 illustrates a diagram of a GUI 300 of a communication service according to some examples of the present disclosure. The communication service shown in FIG. 3 has a number of selectable functions 305. For example, an activity feed, a chat window for chats to individual users or groups, a "teams" function, a meetings function for creating and joining online meetings, a calls function for placing and receiving phone calls, a files function for viewing files associated with the user on the communication service, a store function for installing extra functionality, and a feedback function for submitting feedback on the communication service. In the example of FIG. 3, the teams function is selected as indicated by the vertical bar next to the teams icon. Team and channel selector 310 allows users to select one or more groups termed "teams" and subgroups termed "channels." In the example of FIG. 3, the user belongs to two teams, team 1 and team 2. The user has selected channel 1 of team 2 by selecting the channel name 315.

By selecting a channel, the channel GUI 320 is shown. A tab selector 325 allows users to select different types of content or different subject matter of the channel. In the example shown in FIG. 3, the user has selected to view posts of the channel. This is indicated by the dark bar underneath the "posts" tab. When the posts tab is selected the posts are shown in the channel GUI 320. A user has posted a post 330 asking the rest of the users of this group to "check out this file on project X!" The user has also posted project x.docx, which is a same file that was shared in FIG. 2. As can be appreciated, the reactions entered in the GUI from FIG. 2 and shown in FIG. 2 are not shown in the channel GUI 320.

In this view, a user may also enter input specified to cause the reactions dialog 340 to appear. Users may then select an icon corresponding to a reaction type to leave a reaction. The reactions that were left by users are also shown as icons and a number of reactions for each icon at 345. Another post 347 posts another file 350 about project Y and has shared a file "project y.docx" 350. Various reactions to project Y are shown 355.

Each of the posts 330 and 347 may form their own communication thread. That is, replies may be associated with the original post in the GUI. For example, a reply 360 to post 330 may be visually associated with the original post and may be stored or otherwise indicated in the communication service as being related.

Figure 4:
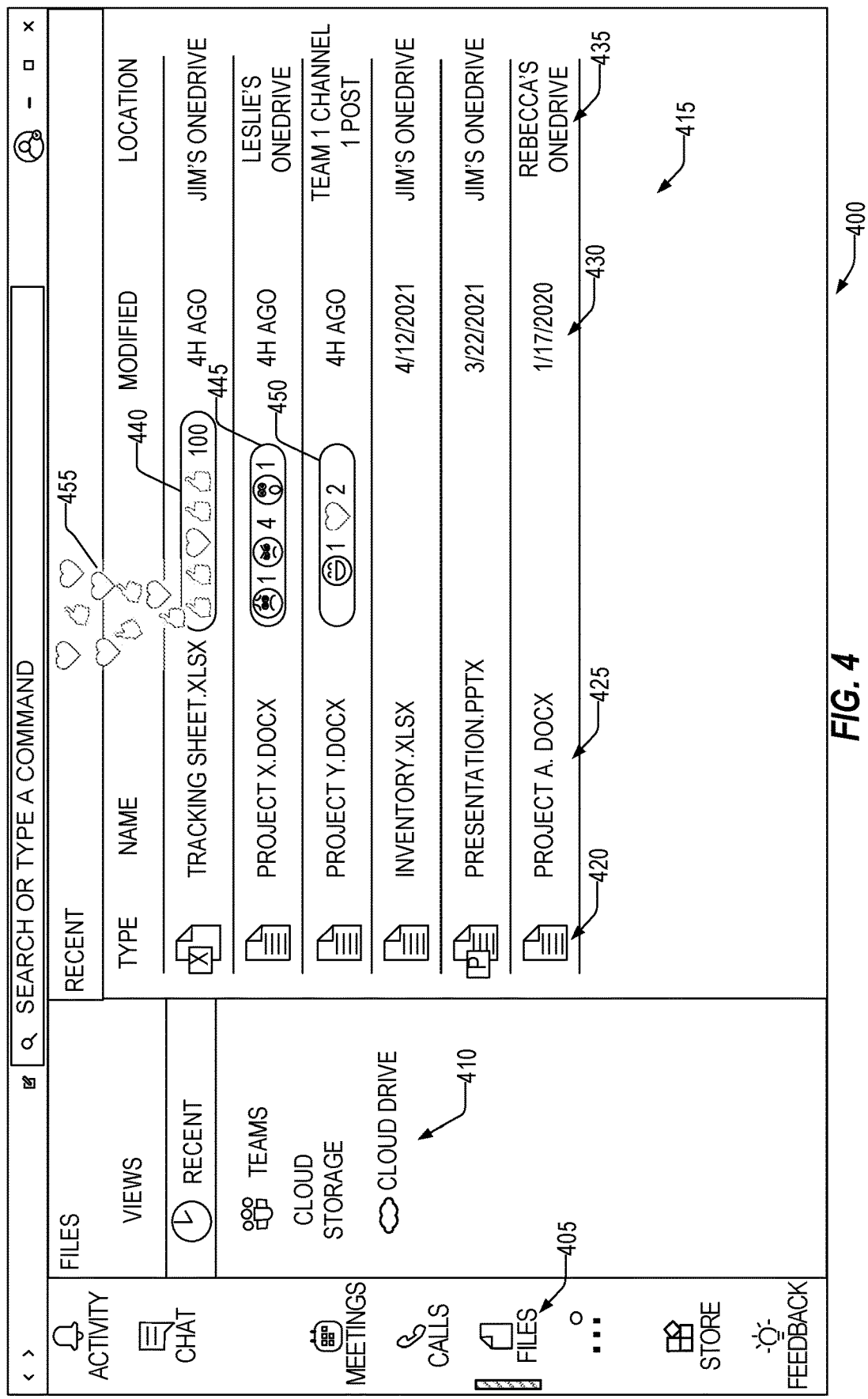
FIG. 4 illustrates a content container management GUI of a network-based content sharing service such as a GUI provided by a communication application of a communication service according to some examples of the present disclosure.

FIG. 4 illustrates a content container management GUI 400 of a network-based content sharing service such as a GUI provided by a communication application of a communication service according to some examples of the present disclosure. In the GUI 400, the content containers are files and thus the GUI 400 displays a file management interface in a file management pane 415. In other examples, other types of containers may be managed through the GUI 400. In the GUI 400, a user has selected the files tab 405 in the selectable functions. This then shows a file management interface with selectable file functions 410. This allows users to change what is displayed in the file management pane 415. For example, to view certain files of certain sharing locations, to view recent files, files in one or more teams, files on a cloud storage account of the user linked to the communication service, filter files shown, and the like. As is shown in FIG. 3, the user has selected the "recent" files. Files shared within sharing locations associated with the user that are most recently shared or modified are then displayed in the file management pane 415.

File management pane 415 is arranged as a series of rows and columns. Each row shows information for a particular file. Each column shows information about the file. For example, the file management pane 415 shows columns with icons for the file type 420, the name or identifier of the file 425, when the file was modified 430, and where the file is located 435. In addition, the file management GUI 400 may allow users to leave reactions (this is not shown in FIG. 4 for clarity) using a reactions dialog, such as shown in FIGS. 2 and 3.

In some examples, and as shown in FIG. 4, the file management GUI 400 may show reactions to the files. For example, reactions to "tracking sheet.xlsx" may be shown in reaction bubble 440. In these examples, a large number of approval and love reactions, represented by thumbs up and heart icons, were left for this content. In these examples, the number of these reactions is over a threshold number of reactions and produces an animation 455 of hearts and thumbs up icons floating away from the row in which tracking sheet.xlsx is shown. This animation may be overlaid on top of the GUI of FIG. 4 such that it may obscure, temporarily, content below the animations. For example, the animation may have hearts and thumbs up icons float from the reaction bubble 440 up to a point in the screen and then disappear. Once all the icons disappear, the reaction animation may end. In other examples, the reaction may loop such that it is continuous.

In FIG. 4, multiple icons representing multiple reaction types are displayed in the animation, but in some examples, only icons representing a single reaction type may be animated. In some examples, whether multiple reaction icons or only a single reaction icon is displayed may depend on the quantity of reactions of each type. For example, a threshold may be established and each reaction type that exceeds the threshold may be included in the animation. Multiple icons may then be interspersed and interact with each other in the animation in a composite animation.

In some examples, when multiple reaction types are represented in an animation, it may be referred to as a composite animation. In some examples, the system may create a composite animated reaction using an animation template that may be selected based upon the number of reaction types exceeding the threshold. Each reaction type is then inserted into the template and the animation is then created. In some examples, the templates have icon slots that are customizable to the reaction types and each icon slot may be ranked in importance in the composite animation. For example, an icon of a reaction type with the most reactions associated with it may be inserted into a first slot position in the template, an icon of a reaction type with the second most reactions may be inserted into a second slot position, and so on, until all positions are filled. The template may specify the location and movement of each icon slot. The final animation may more prominently display icons of the first slot position over those of lower-ranked positions (such as second, third, etc. . . . ) and may more prominently display icons of the second slot position over icons of third, fourth, fifth positions and so on. Creating the animation may thus entail selecting the template, selecting the icon for each slot position, and then inserting the icon into each slot position and animating the icon for each slot position according to the template.

In some examples, positions may be displayed more prominently by increasing the size of the icon(s) for that slot position, by displaying an increased number of icons for that slot position, by displaying the icon(s) for that slot position a longer amount of time, and/or the like.

As shown in FIG. 4, and as noted above, a number of icons may be displayed as part of the animation and the amount of icons representing each position may also depend on the quantity of reactions. For example, if the first reaction type is a reaction type with the greatest number of reactions, the number of icons in the animation representing the first reaction type may exceed the number of icons in the animation representing other reaction types. Similarly, if the second reaction type is a reaction type with the second most number of reactions, the number of icons in the animation representing the second reaction type may be less than the number of icons in the animation representing the first reaction type, but may exceed the number of icons in the animation representing other reaction types. This may continue such that the number of icons representing the reaction types in the animation may be related to the number of reactions of the reaction type. In some examples, the number of icons of a given reaction type may relate to the proportion of that reaction type for all reactions left.

Additionally, the reactions shown in the reaction bubble 440 may also depend on the number of reactions of a given type. In this manner, the reaction bubble 440 may be, when a large quantity of reactions are left for a particular file, a summary of the top reactions. As shown in reaction bubble 440, multiple icons of a same reaction type may be shown to convey a quantity or magnitude of the reaction. That is, there are several thumbs-up reactions and the system may display a number of icons to indicate a high magnitude of the number of reactions of that type. In some examples, this may be determined by a maximum size of the reaction bubble 440 (which may depend on the size of other columns such as file name). The number of icons for a given reaction, and the icons displayed, may depend on the ratio of reaction types. For example, suppose the reactions to "tracking sheet.xlsx" is as follows:

Thumbs up reactions 80
Heart reactions 16
Surprise reactions 2
Angry reactions 2

In this example, the system may determine that five reactions may be presented given the space available. The system may represent the thumbs up reaction with 4 icons to convey that ⅘ths of the reactions were a thumbs up reaction and a heart reaction to convey that a significant portion of the remaining 20% of reactions were heart reactions. That is, the system may have a cutoff percentage to show an icon of a reaction. Those above the threshold percentage of reactions may have icons corresponding to that reaction type displayed in a number corresponding to the percentage of the reactions that were above the threshold. Thus, surprise and angry reactions, accounting for just 2% each of the reactions, did not make the threshold and would not be shown.

In some examples, the reaction bubble 440 may be shown as in FIG. 4 for a large number of reactions. For smaller amounts of reactions, or when all icons can fit into the space available, reaction bubbles such as 445 and 450 may be shown which shows all the reaction icons and the number of each.

Reactions, as shown in FIG. 4, may be aggregated across all sharing locations (such as groups, channels, threads, and the like) where the media (e.g., the file) was shared and that the user viewing the GUI 400 is authorized to view. For example, if the user is authorized to view two teams (as shown in FIG. 3) and four channels each team, then the reactions may be the aggregated reaction of all 8 channels and two teams. Furthermore, the reaction may be aggregated across any personal chats, meetings, calls, or other activity. In some examples, the reactions may be aggregated across other services as well. In still yet other examples, rather than being restricted to groups, channels, and the like to which the user is authorized to view, the aggregated reactions may be to all places where the system is aware that the file container is associated (regardless of the user's authorization to view that area).

Figure 5:
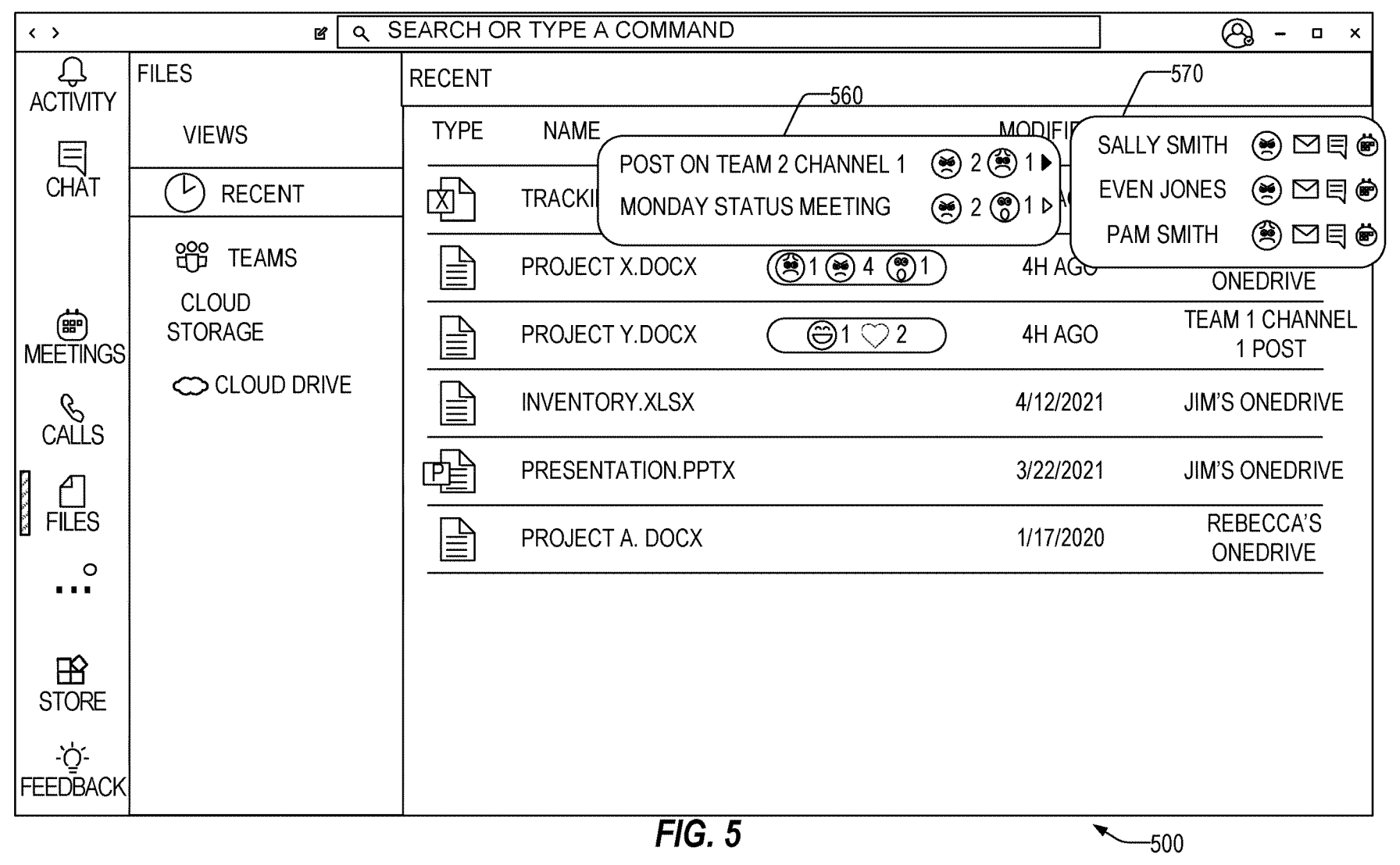

In some examples, for bubble 440, where there are more reactions than space to display their icons, users may provide a predetermined input (such as hovering over the reaction bubble 440) and see a comprehensive list of reactions. In some examples, users may provide a predetermined input (such as hovering over bubbles 440, 445, and 450) to see a context menu showing the locations where the file is shared and a selectable list of those locations. FIG. 5 illustrates a GUI 500 where a user has activated the menu 560 for the "project x.docx" file. This menu may be activated by one or more defined user inputs, such as clicking, hovering, or otherwise selecting the reaction bubbles (e.g., reaction bubble 445 of FIG. 4). The menu 560 shows which content sharing locations (e.g., which channels of which groups, which meetings, which chats, etc. . . . ) a reaction was left in and the reactions for that location. For example, two angry reactions were left and one shocked reaction was left in the Monday status meeting (e.g., FIG. 2). Similarly, two angry reactions and one worried reaction was left in a post on channel 1 of team 2 (e.g., FIG. 3). Users may click or select the sharing location to be taken to that location and in some examples, taken to where the content was shared.

Users may click or select the arrow to the right of the reaction icons to see who left each reaction in menu 570. The menu may also include icons to allow the user viewing the GUI to contact the user that left the reaction to discuss the reaction or the content. This is shown by email icons (to initiate contact via email), chat icons (to initiate contact via chat), and meeting icons (to initiate contact via a meeting or call).

FIG. 5 illustrated a split menu 560, 570, but in other examples, the persons leaving the reactions may be displayed in menu 560 (e.g., underneath and indented from the source of the reactions). In other examples, menu 570 may be displayed immediately rather than menu 560.

Figure 6:
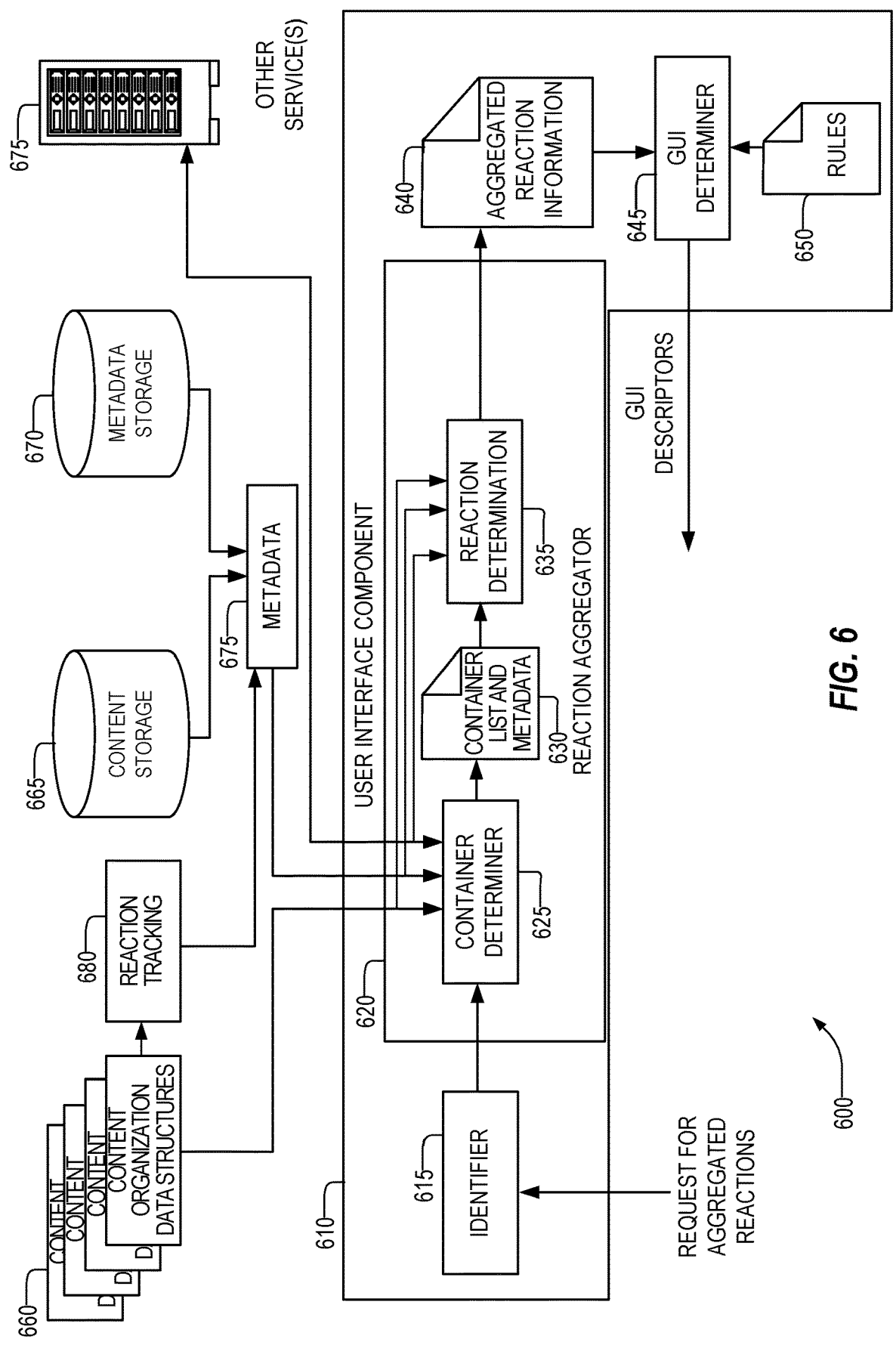
FIG. 6 illustrates a diagram of a user interface component of a reaction aggregation system according to some examples of the present disclosure.

FIG. 6 illustrates a diagram of a user interface component 610 of a reaction aggregation system 600 according to some examples of the present disclosure. In some examples, user interface component 610, or one or more portions thereof, may be implemented by reaction service 130, communication service 120, and/or network-based content service 140 of FIG. 1. User interface component 610 may receive a request for a GUI including the aggregated reactions, may create one or more GUI descriptors for providing the aggregated reactions; and transmit these GUI descriptors to the requestor. The requestor may then utilize the GUI descriptors to display a GUI with aggregated reactions. The requestor may be a user, or a network-based content service (which may then incorporate the GUI descriptors in their own GUIs). For example, the request may be for a content container (e.g., a file) management user interface.

The user interface component 610 may first determine an identifier that is used to determine a list of content containers (files) associated with the identifier that are to be displayed within the GUI. In some examples, the system only determines aggregated reactions for a particular sharing location—in which case, the identifier is an identifier of the sharing location (e.g., a group or subgroup). In other examples, the identifier may be a user and the user interface component 610 may determine content containers associated with that user—that is, content containers that are shared within sharing locations that the user has access to as well as content the user has shared or content shared directly with the user. In some examples, the reactions may also be for content shared with the user or a particular content sharing location on other network-based content sharing services, such as network-based content sharing services 675. The granularity of reaction aggregation and the sharing locations aggregated may be set by the user (e.g., through selection of one or more GUI options), may be set by an administrator, or a combination.

Reaction aggregator 620 may determine a list of files and their aggregated reactions applicable to the identifier 615. In some examples, the container determiner 625 of the reaction aggregator may utilize content organization data structures of the network-based content-sharing service to identify a list of shared content containers (e.g., files) for sharing locations associated with the identifier 615. If the identifier is a particular sharing location, those content organization data structures 660 matching that identifier and in some examples, those lower in the hierarchy (e.g., if the identifier is a group identifier, than data structures representing the channels below that) may be identified. For a user identifier, all data structures representing any content organization data structure that the user is authorized to view may be identified.

Content organization data structures may be one or more data structures that store information about an organizational level of the content-sharing service, such as a group, a channel, a thread, or the like. In some examples, the data structures may be hierarchical. That is, a group data structure may have fields that describe the group and may point to one or more data structures that describe one or more channels or threads within the group. Those channel data structures may have fields that describe the channels or threads and may point to data structures describing other lower levels of hierarchy. Included in the data structures may be descriptions of content shared, including content containers in which the content is located. This may be a pointer to a storage location of the content container. In some examples, the content organization data structures 660 may include reaction information.

The container determiner 625 may identify the content corresponding to the identifier 615 and may retrieve metadata 675 corresponding to those files. Metadata may include content information, title information, container type information, container size, a last modified date, and the like. As previously described, in some examples, reaction information may be stored in the content organization data structures. That is, each reaction and metadata about the reaction maybe stored in the content organization data structures. In other examples, this reaction information is stored in the metadata 675. Metadata 675 may be stored in metadata storage 670 or in content storage 665 with the content containers.

The content container list and metadata 630 determined by the content determiner 625 may be passed to the reaction determination component 635 that may aggregate the reactions for the particular identifier 615 by type. For example, and as noted, the reaction determination 635 may count, for each of the containers in the container list 630, the reactions of each type from the content organization data structures 660. In other examples, the reactions may be stored in metadata 675. Metadata 675 may be stored with the content containers in content storage 665 or may be stored separately as part of the metadata storage 670. In the latter examples, where the reactions are stored within the metadata storage 670, the reaction determination component 635 may obtain the metadata for all the content indicated as shared in the container list and metadata 630 and identify a sum of the reactions of each type. In examples in which the content organization data structures 660 include reaction information, then the container determiner 625 may be a same component as the reaction determination component 635 and the reactions may be aggregated at the same time as when the container list and metadata 630 is generated.

In other examples, a reaction tracking component 680 may monitor one or more of the content sharing location(s) of the network-based content sharing service for reactions and, upon identifying a new or updated reaction, may update a metadata structure 675 corresponding to a content container that was the subject of a reaction to indicate the reaction and/or information about the reaction (e.g., where the reaction was left, who left the reaction, when the reaction was left, and the like). In other examples, reaction tracking component 680 may have a separate data store separate from meta data about the content containers that may track reaction data.

As previously noted, the content containers for a particular shared file that is shared in multiple places may be a same content container and the share is just a link pointing to the location of the content container. In other examples, the content containers may be different. In these examples, the system, container determiner 625, reaction tracking component 680, and reaction determination component 635 may use a fingerprint or hash of the container to determine whether two separate containers are a same container with same content and thus, whether reactions to both are aggregated as one container. That is, if two containers have a same fingerprint, the reactions to one container may be aggregated with the reactions to the other container.

In some examples, the reactions may be tied to a content container. That is, a same content may be packaged differently in different content containers and the reactions may be aggregated differently. For example, in the former case, reactions may be for a whole slideshow as stored in a file. In other examples, content may be separately reacted to with a content container. For example, users may react to individual media items in a content container, such as an individual slide. In these examples, the reaction may be tied to a particular level of granularity in the content. The system may utilize a fingerprint or other matching technique to match same media between different content containers.

The aggregated reaction information 640 may then be passed to a GUI determiner 645. GUI determiner 645 may create one or more representations of the aggregated reactions as well as format a display of any other information, such as a file management interface, such as shown in FIGS. 4 and 5. The GUI determiner 645 may use one or more rules and/or templates 650 to determine a visual representation of the aggregated reactions. For example, as described with respect to FIGS. 4 and 5. In addition, rules and/or templates 650 may include templates for the file management interface shown in FIGS. 4 and 5. In some examples, the GUI determiner 645 may output one or more GUI descriptors. For example, GUI descriptors may be one or more file(s) that, when received by a client application are used to render a GUI determined by the GUI determiner. Example GUI descriptors may include HTML files, scripting files, Java files, plugins, code modules, data files, and the like. The files may be executed by or interpreted by the client application to produce the GUI of the GUI determiner 645.

In some examples, the content organization data structures 660 may be from a single content-sharing service, but in other examples, the content organization data structures 660 may be from multiple content sharing services and may be obtained by the user interface component 610 using an API. Similarly, the user interface component 610 may aggregate reactions from other network-based content sharing services 675. The other network-based content sharing services 675 may organize content differently and may not use content organization data structures 660.

Figure 7:
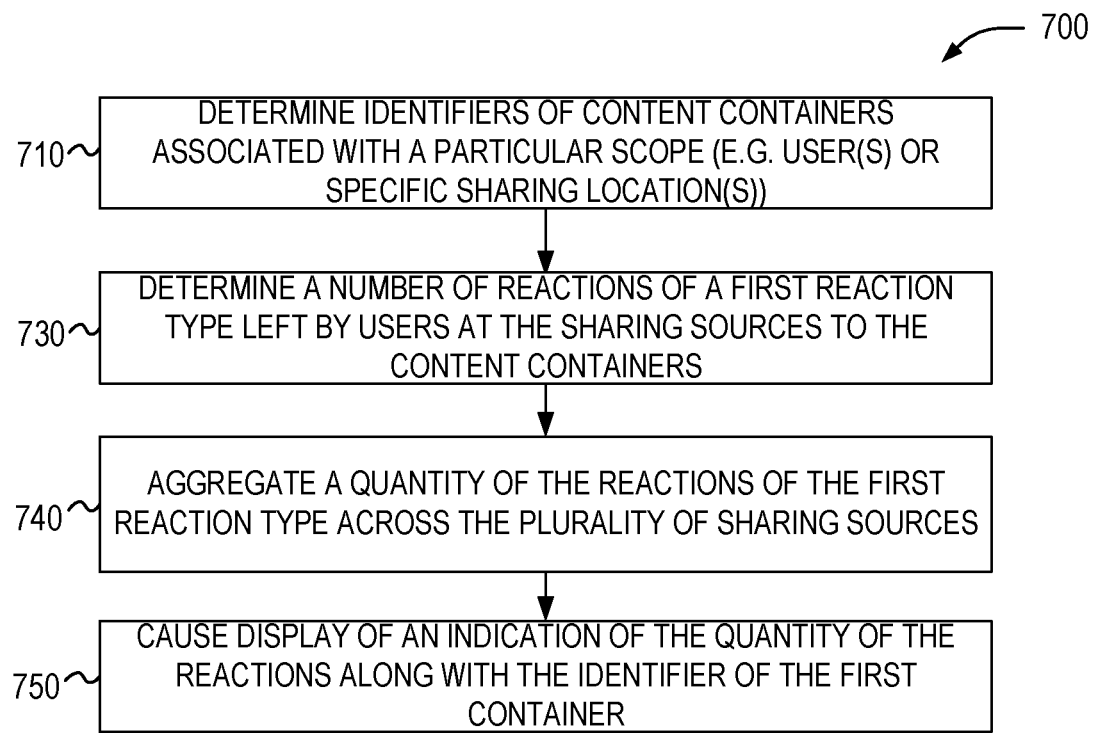
FIG. 7 illustrates a flowchart of a method of aggregating reactions according to some examples of the present disclosure.

FIG. 7 illustrates a flowchart of a method 700 of aggregating reactions according to some examples of the present disclosure. At operation 710, the system may determine content containers (e.g., files) associated with a particular scope (such as one or more users, and/or sharing locations). For example, the scope may be one or more sharing locations to which the user has access, and operation 710 may determine each of a plurality of files associated with the one or more sharing locations. In some examples, the one or more sharing locations may be one or more communication groups or subgroups (and one or more threads within those groups or subgroups).

In some examples, at least two of the sharing locations (e.g., communication threads) may include or comprise different communication modalities. In some examples, the one or more sharing locations may be access restricted to a subgroup of users. In some examples, the scope may be all content containers shared with a sharing location to which the user requesting the display, or for whom the display is created, is authorized to view. In some examples, the scope may be a subset of all content containers shared with a sharing location to which the user requesting the display, or for whom the display is created, is authorized to view. For example, the user or administrator may select certain sharing locations. In some examples, the scope may include content containers from one or more network-based content sharing services (e.g., a plurality of network-based content sharing services). In some examples, a communication modality may be defined as a mode of communication. For example, chat, message, email, voice, online meetings, and the like. Causing display may be accomplished by creating and transmitting one or more GUI descriptors that may be displayed by a client application such as a browser or dedicated application.

At operation 730 the system may determine a number of reactions of a first reaction type to the first content container left by users at the sharing sources (e.g., in the plurality of communication threads, or the like), the reactions being user selected from a defined group of reaction types to the first content container selected in one or more of the communication threads;

At operation 740 the system may aggregate a quantity of reactions of a first reaction type across a plurality of sharing sources (e.g., the plurality of communication threads, a plurality of network-based sharing services, and the like). For example, the reactions for one or more content containers determined at operation 710 across one or more sharing locations. In some examples, the one or more sharing locations may be a same sharing locations identified by the particular scope, or may be different sharing locations.

At operation 750, the system may cause display of an indication of the quantity of the reactions along with the identifier of the containers (e.g., the files). The system may cause display, for example, by sending one or more files, such as GUI descriptors to a client application for display.

Figure 8:
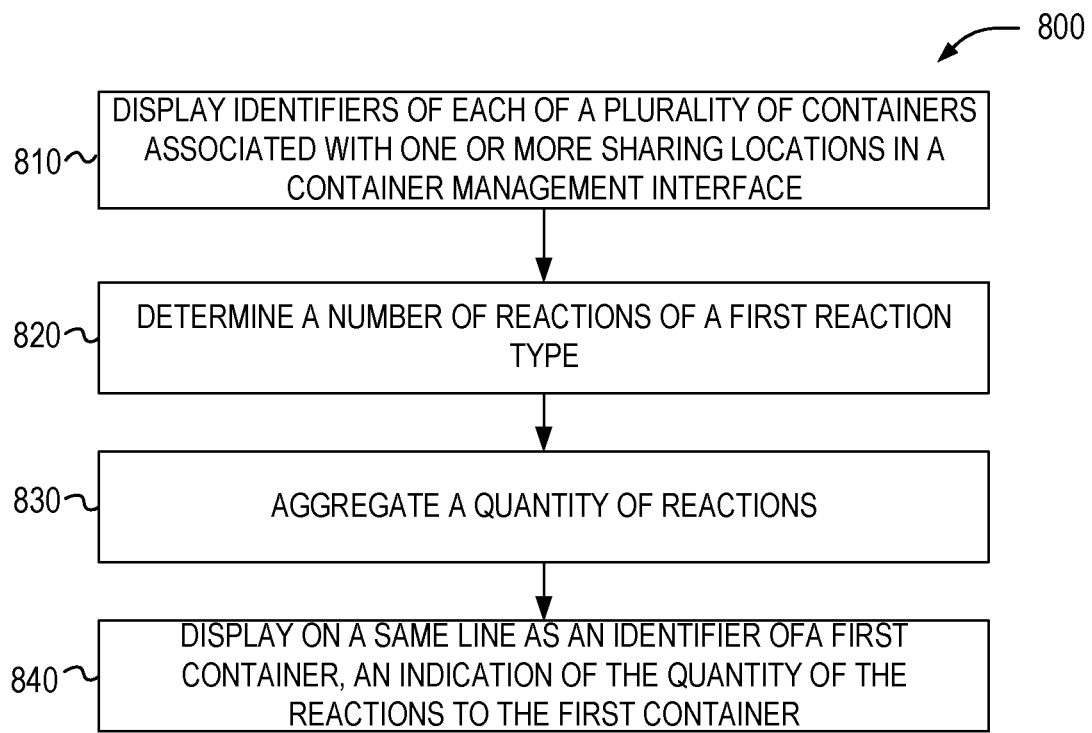
FIG. 8 illustrates a method of displaying aggregated file reactions in a file management graphical user interface according to some examples of the present disclosure.

FIG. 8 illustrates a method 800 of displaying aggregated file reactions in a file management graphical user interface according to some examples of the present disclosure. For example, a file management interface as shown in FIGS. 4 and 5. At operation 810, the system may display, as part of a container listing of a container management graphical user interface, identifiers of each of a plurality of content containers associated with a system, including a first content container. For example, the system may display a file listing of a file management interface. The system may include one or more groups, subgroups, the entire network-based content sharing service, or the like.

At operation 820, the system may determine a number of reactions of a one or more reaction types to containers of the system, the reactions left by users of the system and being user selected from a defined group of reaction types. In some examples, the reactions are selected through one or more of a plurality of different user interfaces that are different than the container management graphical user interface.

At operation 830, the system may aggregate a quantity of the reactions of the one or more reaction types left by users across the plurality of different user interfaces that are different than the management graphical user interface.

At operation 840, the system may display, on a same line as an identifier of the first container in the container management graphical user interface, an indication of the quantity of the reactions adjacent to graphical icon(s) of the identifier of the one or more reaction types.

While the above mentioned reactions that are predefined, in other examples, other reactions may also be aggregated. For example, short key message replies, key video segments, positive or negative emails or messages and the like. For example, FIG. 9 illustrates a diagram of a GUI of a communication service according to some examples of the present disclosure. GUI 900 may show a file list as shown in FIG. 4, but may additionally show a reaction bubble 940 that shows reactions to the file that comprise video clips and email messages. The video clips and emails are shown as icons with a number of reactions next to it. In some examples, users may leave reaction video clips or emails the same way they leave other reactions—by selecting a video clip or email reaction in a menu next to the file (e.g., as shown in FIG. 2). In other examples, the system may scan contents of other content containers to identify a reaction to other content in other content containers. For example, emails of an account of a user may be scanned using Natural Language Processing and sentiment analysis algorithms to identify that the user is reacting to a file and to tease out a sentiment of the reaction. In other examples, rather than show an email or video clip icon, the reaction for the video clip or email may be converted using sentiment analysis to one of the predefined reactions such as an angry reaction with a corresponding angry icon when the user is expressing anger in the email or video clip. In these examples this reaction will be aggregated with other anger reactions, including those reactions that were selected directly (e.g., from the menu 250 in FIG. 2).

As noted earlier, the user may select the reaction bubble 940 and be shown a menu that includes links to where the reactions were left, and who left the reactions, such as shown in FIG. 5.

For videos or video clips, the clips may be automatically transcribed, and the transcription may be fed through a natural language processing and understanding algorithm to detect whether the user is referring to any particular content containers. If reference to particular content containers is found, the system may then determine a sentiment associated with the content containers. Example algorithms for transcription include hidden markov models, dynamic time warping based speech recognition, neural networks, deep feedforward neural networks, recurrent neural networks, and end-to-end automatic speech recognition.

Once the transcription is created, a same model, or an additional model may be used to determine if the transcription mentions content. This may also be used for emails and other text messages and the like. For example, a topic classifier, such as Latent Dirichlet Analysis (LDA) may determine if the content is a topic of discussion. In simpler approaches, key word or text searching for file names or words from the content of the content container may be used. For example, if the transcription uses a phrase from the content that is above a predetermined size, the system may infer that the content was discussed. In still other examples, users may explicitly link their videos and/or emails using references to the content such as links to the content container, @ mentions to the content container or content, and the like.

Sentiment analysis may use knowledge-based techniques, statistical methods, or hybrid approaches. For example, latent semantic analysis, support vector machines, bag of words, pointwise mutual information, and deep learning. As noted, in some examples, the reactions from the videos or emails may then be converted to a standardized reaction. This may be done by mapping one or more expressed sentiments to one or more standardized reactions using a prespecified mapping table.

In some examples, one or more actions may be triggered based upon the aggregated reactions. For example, when a particular piece of content exceeds a specified number of aggregated reactions, one or more actions may be taken. For example a notification may be sent to an owner of the content, the content may be removed (e.g., a number of negative reactions may lead to removal), an email may be sent, or the like. In some examples, one or more reports may be generated based upon the reactions that may be broken down by type, user, and the like.

Figure 10:
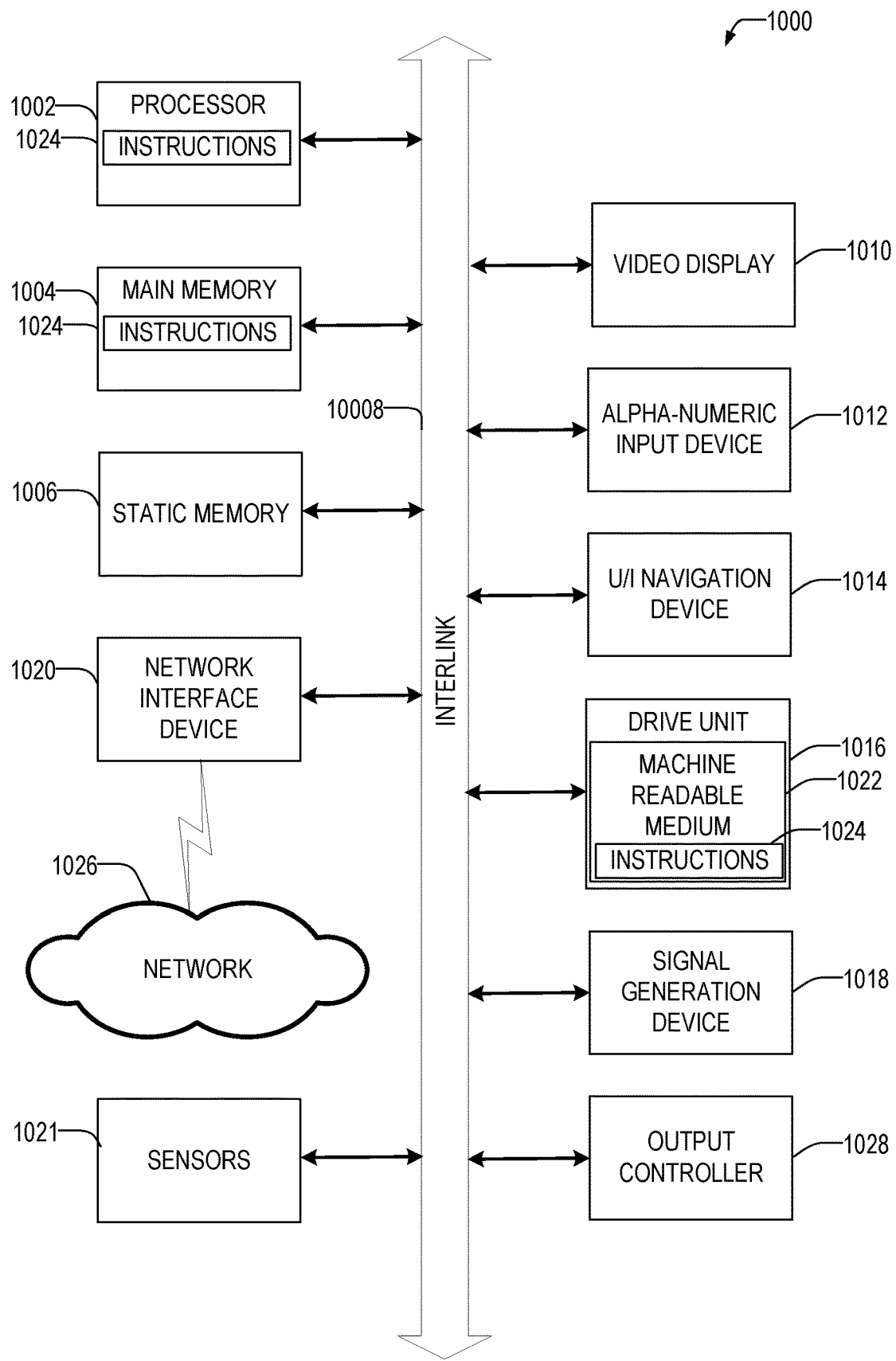
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be of the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 1000 may, alone, or in combination with other machines, be configured by instructions to implement a client device A 115, client device B 110, file storage 150, communication service 120, reaction service 130, network-based content sharing service 140, implement the GUIs of FIGS. 2-5; the components of FIG. 6; and the methods of FIGS. 7 and 8. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020. The Machine 1000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

Other Notes and Examples

Example 1 is a method for displaying aggregated file reactions in a file listing user interface of a network-based service, the method comprising: determining identifiers of each of a plurality of files shared within a communication group or subgroup, including a first file, the first file associated with and accessible in each of a plurality of communication groups or subgroups of the network-based service, at least two of the communication groups or subgroups including different communication modalities, the plurality of communication groups or subgroups restricted to a subgroup of defined users, a communication modality being a mode of communication; determining a number of reactions of a first reaction type to the first file left by users in the plurality of communication groups or subgroups, the reactions being user selected in a user interface associated with the communication groups or subgroups from a defined group of reaction types; aggregating a quantity of the reactions of the first reaction type across the plurality of communication groups or subgroups; and causing display of an indication of the quantity of the reactions along with the identifier of the first file in the file listing user interface associated with one or more of the communication groups or subgroups.

In Example 2, the subject matter of Example 1 includes, recording a reaction of a first reaction type in an interface for a first communication group or subgroup of the plurality of communication groups or subgroups; accessing a metadata record for the first file; recording the reaction of the first reaction type in the metadata record for the first file; recording a second reaction of the first reaction type in a second interface for a second communication group or subgroups of the plurality of communication groups or subgroups; accessing the metadata record for the first file; and recording the reaction of the first reaction type in the metadata record for the first file.

In Example 3, the subject matter of Example 2 includes, wherein accessing the metadata record of the first file comprises reading the metadata record from a location of the first file, the location of the first file identified based upon links to the first file posted in the first communication group or subgroup.

In Example 4, the subject matter of Examples 2-3 includes, wherein accessing the metadata record of the first file comprises reading the metadata record from metadata service over a network, the metadata service storing metadata in a location separate from a location of the first file.

In Example 5, the subject matter of Examples 2-4 includes, wherein accessing the metadata record of the first file comprises comparing a file hash of the first file with a file hash identifier associated with a plurality of metadata records.

In Example 6, the subject matter of Examples 1-5 includes, wherein the communication modalities comprise one or more of: chat message threads, a network-based meeting, and a voice over internet protocol (VOIP) call.

In Example 7, the subject matter of Examples 1-6 includes, wherein causing display of the indication of the quantity of the reactions comprises causing display of a different graphical representation of the first reaction type depending on the quantity.

In Example 8, the subject matter of Examples 1-7 includes, wherein causing display of the indication of the quantity of the reactions comprises causing display of a graphical representation of the first reaction type at a size determined based upon the quantity.

In Example 9, the subject matter of Examples 1-8 includes, wherein causing display of the indication of the quantity of the reactions comprises causing a display of an animation of a graphical representation of the first reaction type depending on the quantity.

In Example 10, the subject matter of Examples 1-9 includes, causing display of links to interfaces for the plurality of communication threads within the file listing user interface.

Example 11 is a computing device for causing display of aggregated file reactions in a file listing user interface of a network-based service, the computing device comprising: a processor; a memory, the memory storing instructions, which when executed by the processor, causes the computing device to perform operations comprising: determining identifiers of each of a plurality of files shared within a communication group or subgroup, including a first file, the first file associated with and accessible in each of a plurality of communication groups or subgroups of the network-based service, at least two of the communication groups or subgroups including different communication modalities, the plurality of communication groups or subgroups restricted to a subgroup of defined users, a communication modality being a mode of communication; determining a number of reactions of a first reaction type to the first file left by users in the plurality of communication groups or subgroups, the reactions being user selected in a user interface associated with the communication groups or subgroups from a defined group of reaction types; aggregating a quantity of the reactions of the first reaction type across the plurality of communication groups or subgroups; and causing display of an indication of the quantity of the reactions along with the identifier of the first file in the file listing user interface associated with one or more of the communication groups or subgroups.

In Example 12, the subject matter of Example 11 includes, wherein the operations further comprise: recording a reaction of a first reaction type in an interface for a first communication group or subgroup of the plurality of communication groups or subgroups; accessing a metadata record for the first file; recording the reaction of the first reaction type in the metadata record for the first file; recording a second reaction of the first reaction type in a second interface for a second communication group or subgroups of the plurality of communication groups or subgroups; accessing the metadata record for the first file; and recording the reaction of the first reaction type in the metadata record for the first file.

In Example 13, the subject matter of Example 12 includes, wherein the operations of accessing the metadata record of the first file comprises reading the metadata record from a location of the first file, the location of the first file identified based upon links to the first file posted in the first communication group or subgroup.

In Example 14, the subject matter of Examples 12-13 includes, wherein the operations of accessing the metadata record of the first file comprises reading the metadata record from metadata service over a network, the metadata service storing metadata in a location separate from a location of the first file.

In Example 15, the subject matter of Examples 12-14 includes, wherein the operations of accessing the metadata record of the first file comprises comparing a file hash of the first file with a file hash identifier associated with a plurality of metadata records.

In Example 16, the subject matter of Examples 11-15 includes, wherein the communication modalities comprise one or more of: chat message threads, a network-based meeting, and a voice over internet protocol (VOIP) call.

In Example 17, the subject matter of Examples 11-16 includes, wherein the operations of causing display of the indication of the quantity of the reactions comprises causing display of a different graphical representation of the first reaction type depending on the quantity.

In Example 18, the subject matter of Examples 11-17 includes, wherein the operations of causing display of the indication of the quantity of the reactions comprises causing display of a graphical representation of the first reaction type at a size determined based upon the quantity.

In Example 19, the subject matter of Examples 11-18 includes, wherein the operations of causing display of the indication of the quantity of the reactions comprises causing display of an animation of a graphical representation of the first reaction type depending on the quantity.

In Example 20, the subject matter of Examples 11-19 includes, wherein the operations further comprise causing display of links to interfaces for the plurality of communication threads within the file listing user interface.

Example 21 is a machine-readable medium, storing instructions for causing display of aggregated file reactions in a file listing user interface of a network-based service, the instructions, which when executed by the machine, causes the machine to perform operations comprising: determining identifiers of each of a plurality of files shared within a communication group or subgroup, including a first file, the first file associated with and accessible in each of a plurality of communication groups or subgroups of the network-based service, at least two of the communication groups or subgroups including different communication modalities, the plurality of communication groups or subgroups restricted to a subgroup of defined users, a communication modality being a mode of communication; determining a number of reactions of a first reaction type to the first file left by users in the plurality of communication groups or subgroups, the reactions being user selected in a user interface associated with the communication groups or subgroups from a defined group of reaction types; aggregating a quantity of the reactions of the first reaction type across the plurality of communication groups or subgroups; and causing display of an indication of the quantity of the reactions along with the identifier of the first file in the file listing user interface associated with one or more of the communication groups or subgroups.

In Example 22, the subject matter of Example 21 includes, wherein the operations further comprise: recording a reaction of a first reaction type in an interface for a first communication group or subgroup of the plurality of communication groups or subgroups; accessing a metadata record for the first file; recording the reaction of the first reaction type in the metadata record for the first file; recording a second reaction of the first reaction type in a second interface for a second communication group or subgroups of the plurality of communication groups or subgroups; accessing the metadata record for the first file; and recording the reaction of the first reaction type in the metadata record for the first file.

In Example 23, the subject matter of Example 22 includes, wherein the operations of accessing the metadata record of the first file comprises reading the metadata record from a location of the first file, the location of the first file identified based upon links to the first file posted in the first communication group or subgroup.

In Example 24, the subject matter of Examples 22-23 includes, wherein the operations of accessing the metadata record of the first file comprises reading the metadata record from metadata service over a network, the metadata service storing metadata in a location separate from a location of the first file.

In Example 25, the subject matter of Examples 22-24 includes, wherein the operations of accessing the metadata record of the first file comprises comparing a file hash of the first file with a file hash identifier associated with a plurality of metadata records.

In Example 26, the subject matter of Examples 21-25 includes, wherein the communication modalities comprise one or more of: chat message threads, a network-based meeting, and a voice over internet protocol (VOIP) call.

In Example 27, the subject matter of Examples 21-26 includes, wherein the operations of causing display of the indication of the quantity of the reactions comprises causing display of a different graphical representation of the first reaction type depending on the quantity.

In Example 28, the subject matter of Examples 21-27 includes, wherein the operations of causing display of the indication of the quantity of the reactions comprises causing display of a graphical representation of the first reaction type at a size determined based upon the quantity.

In Example 29, the subject matter of Examples 21-28 includes, wherein the operations of causing display of the indication of the quantity of the reactions comprises causing display of an animation of a graphical representation of the first reaction type depending on the quantity.

In Example 30, the subject matter of Examples 21-29 includes, wherein the operations further comprise causing display of links to interfaces for the plurality of communication threads within the file listing user interface.

Example 31 is a device for displaying aggregated file reactions in a file listing user interface of a network-based service, the device comprising: means for determining identifiers of each of a plurality of files shared within a communication group or subgroup, including a first file, the first file associated with and accessible in each of a plurality of communication groups or subgroups of the network-based service, at least two of the communication groups or subgroups including different communication modalities, the plurality of communication groups or subgroups restricted to a subgroup of defined users, a communication modality being a mode of communication; means for determining a number of reactions of a first reaction type to the first file left by users in the plurality of communication groups or subgroups, the reactions being user selected in a user interface associated with the communication groups or subgroups from a defined group of reaction types; means for aggregating a quantity of the reactions of the first reaction type across the plurality of communication groups or subgroups; and means for causing display of an indication of the quantity of the reactions along with the identifier of the first file in the file listing user interface associated with one or more of the communication groups or subgroups.

In Example 32, the subject matter of Example 31 includes, means for recording a reaction of a first reaction type in an interface for a first communication group or subgroup of the plurality of communication groups or subgroups; means for accessing a metadata record for the first file; means for recording the reaction of the first reaction type in the metadata record for the first file; means for recording a second reaction of the first reaction type in a second interface for a second communication group or subgroups of the plurality of communication groups or subgroups; means for accessing the metadata record for the first file; and means for recording the reaction of the first reaction type in the metadata record for the first file.

In Example 33, the subject matter of Example 32 includes, wherein the means for accessing the metadata record of the first file comprises means for reading the metadata record from a location of the first file, the location of the first file identified based upon links to the first file posted in the first communication group or subgroup.

In Example 34, the subject matter of Examples 32-33 includes, wherein the means for accessing the metadata record of the first file comprises means for reading the metadata record from metadata service over a network, the metadata service storing metadata in a location separate from a location of the first file.

In Example 35, the subject matter of Examples 32-34 includes, wherein the means for accessing the metadata record of the first file comprises means for comparing a file hash of the first file with a file hash identifier associated with a plurality of metadata records.

In Example 36, the subject matter of Examples 31-35 includes, wherein the communication modalities comprise one or more of: chat message threads, a network-based meeting, and a voice over internet protocol (VOIP) call.

In Example 37, the subject matter of Examples 31-36 includes, wherein the means for causing display of the indication of the quantity of the reactions comprises means for causing display of a different graphical representation of the first reaction type depending on the quantity.

In Example 38, the subject matter of Examples 31-37 includes, wherein the means for causing display of the indication of the quantity of the reactions comprises means for causing a graphical representation of the first reaction type at a size determined based upon the quantity.

In Example 39, the subject matter of Examples 31-38 includes, wherein the means for causing display of the indication of the quantity of the reactions comprises means for causing animation of a graphical representation of the first reaction type depending on the quantity.

In Example 40, the subject matter of Examples 31-39 includes, means for displaying links to interfaces for the plurality of communication threads within the file listing user interface.

Example 41 is a method for displaying aggregated file reactions in a file management graphical user interface, the method comprising: displaying, as part of a file listing of the file management graphical user interface, identifiers of each of a plurality of files associated with one or more file sharing locations, including a first file, the file sharing locations comprising places at which a file may be shared between at least two users of a content sharing service; determining a number of reactions of a first reaction type to the first file left by users of the system, the reactions being user selected from a defined group of reaction types to the first file selected by users, the reactions selected through one or more of a plurality of different user interfaces that are different than the file management graphical user interface; aggregating a quantity of the reactions of the first reaction type left by users across the plurality of different user interfaces that are different than the file management graphical user interface; and displaying, on a same line as an identifier of the first file in the file management graphical user interface, an indication of the quantity of the reactions adjacent to a graphical icon of the identifier of the first reaction type.

In Example 42, the subject matter of Example 41 includes, wherein the indication of the quantity of the reactions comprises animating the graphical icon of the identifier of the first reaction type based upon the quantity of the reactions.

In Example 43, the subject matter of Examples 41-42 includes, wherein a size of the graphical icon increases in dependence on an increase in the quantity of reactions.

In Example 44, the subject matter of Examples 41-43 includes, displaying, on the same line as the identifier of the first file in the file management graphical user interface, a second indication of a second quantity of reactions of a second type adjacent to a graphical icon of the identifier of the first reaction type.

In Example 45, the subject matter of Examples 41-44 includes, providing, in the file management graphical user interface, a user selectable element, the user selectable element providing selectable links that point to the one or more of the plurality of different user interfaces in which users provided feedback on the first file.

Example 46 is a computing device for displaying aggregated file reactions in a file management graphical user interface, the computing device comprising: a processor; a memory, the memory storing instructions, which when executed by the processor, causes the computing device to perform operations comprising: displaying, as part of a file listing of the file management graphical user interface, identifiers of each of a plurality of files associated with one or more file sharing locations, including a first file, the file sharing locations comprising places at which a file may be shared between at least two users of a content sharing service; determining a number of reactions of a first reaction type to the first file left by users of the system, the reactions being user selected from a defined group of reaction types to the first file selected by users, the reactions selected through one or more of a plurality of different user interfaces that are different than the file management graphical user interface; aggregating a quantity of the reactions of the first reaction type left by users across the plurality of different user interfaces that are different than the file management graphical user interface; and displaying, on a same line as an identifier of the first file in the file management graphical user interface, an indication of the quantity of the reactions adjacent to a graphical icon of the identifier of the first reaction type.

In Example 47, the subject matter of Example 46 includes, wherein the indication of the quantity of the reactions comprises animating the graphical icon of the identifier of the first reaction type based upon the quantity of the reactions.

In Example 48, the subject matter of Examples 46-47 includes, wherein a size of the graphical icon increases in dependence on an increase in the quantity of reactions.

In Example 49, the subject matter of Examples 46-48 includes, wherein the operations further comprise: displaying, on the same line as the identifier of the first file in the file management graphical user interface, a second indication of a second quantity of reactions of a second type adjacent to a graphical icon of the identifier of the first reaction type.

In Example 50, the subject matter of Examples 46-49 includes, wherein the operations further comprise: providing, in the file management graphical user interface, a user selectable element, the user selectable element providing selectable links that point to the one or more of the plurality of different user interfaces in which users provided feedback on the first file.

Example 51 is a machine-readable medium, storing instructions for displaying aggregated file reactions in a file management graphical user interface, the instructions, which when executed, cause a machine to perform operations comprising: displaying, as part of a file listing of the file management graphical user interface, identifiers of each of a plurality of files associated with one or more file sharing locations, including a first file, the file sharing locations comprising places at which a file may be shared between at least two users of a content sharing service; determining a number of reactions of a first reaction type to the first file left by users of the system, the reactions being user selected from a defined group of reaction types to the first file selected by users, the reactions selected through one or more of a plurality of different user interfaces that are different than the file management graphical user interface; aggregating a quantity of the reactions of the first reaction type left by users across the plurality of different user interfaces that are different than the file management graphical user interface; and displaying, on a same line as an identifier of the first file in the file management graphical user interface, an indication of the quantity of the reactions adjacent to a graphical icon of the identifier of the first reaction type.

In Example 52, the subject matter of Example 51 includes, wherein the indication of the quantity of the reactions comprises animating the graphical icon of the identifier of the first reaction type based upon the quantity of the reactions.

In Example 53, the subject matter of Examples 51-52 includes, wherein a size of the graphical icon increases in dependence on an increase in the quantity of reactions.

In Example 54, the subject matter of Examples 51-53 includes, wherein the operations further comprise: displaying, on the same line as the identifier of the first file in the file management graphical user interface, a second indication of a second quantity of reactions of a second type adjacent to a graphical icon of the identifier of the first reaction type.

In Example 55, the subject matter of Examples 51-54 includes, wherein the operations further comprise: providing, in the file management graphical user interface, a user selectable element, the user selectable element providing selectable links that point to the one or more of the plurality of different user interfaces in which users provided feedback on the first file.

Example 56 is a method for displaying aggregated file reactions in a file management graphical user interface, the method comprising: displaying, as part of a file listing of the file management graphical user interface, identifiers of each of a plurality of files associated with one or more file sharing locations, including a first file, the file sharing locations comprising places at which a file may be shared between at least two users of a content sharing service; determining a number of reactions of a first reaction type to the first file left by users of the system, the reactions being user selected from a defined group of reaction types to the first file selected by users, the reactions selected through one or more of a plurality of different user interfaces that are different than the file management graphical user interface; aggregating a quantity of the reactions of the first reaction type left by users across the plurality of different user interfaces that are different than the file management graphical user interface; and displaying, on a same line as an identifier of the first file in the file management graphical user interface, an indication of the quantity of the reactions adjacent to a graphical icon of the identifier of the first reaction type.

In Example 57, the subject matter of Example 56 includes, wherein the indication of the quantity of the reactions comprises animating the graphical icon of the identifier of the first reaction type based upon the quantity of the reactions.

In Example 58, the subject matter of Examples 56-57 includes, wherein a size of the graphical icon increases in dependence on an increase in the quantity of reactions.

In Example 59, the subject matter of Examples 56-58 includes, displaying, on the same line as the identifier of the first file in the file management graphical user interface, a second indication of a second quantity of reactions of a second type adjacent to a graphical icon of the identifier of the first reaction type.

In Example 60, the subject matter of Examples 56-59 includes, providing, in the file management graphical user interface, a user selectable element, the user selectable element providing selectable links that point to the one or more of the plurality of different user interfaces in which users provided feedback on the first file.

Example 61 is at least one machine-readable medium including instructions that, when executed by processing circuitry, cause the processing circuitry to perform operations to implement of any of Examples 1-60.

Example 62 is an apparatus comprising means to implement of any of Examples 1-60.

Example 63 is a system to implement of any of Examples 1-60.

Example 64 is a method to implement of any of Examples 1-60.

What is claimed is:

1. A method for displaying aggregated file reactions in a user interface, the method comprising:
  determining identifiers of each of a plurality of files shared within a plurality of communication groups or subgroups of a plurality of network based services, including a first file, the first file associated with and accessible in a subset of the plurality of communication groups or subgroups, the subset including at least two communication groups or subgroups, the communication groups or subgroups within the subset restricted to a subgroup of defined members, and a first of the communication groups or subgroups in the subset including an ability of the subgroup of defined members to communicate with each other using a first communication mode and a second of the communication groups or subgroups in the subset including an ability of the subgroup of defined members to communicate with each other using a second communication mode, the at least two of the plurality of communication groups or subgroups having separate user interface screens, and that at least two of the plurality of communication groups or subgroups each having a plurality of members;

aggregating a number of reactions of a first reaction type to the first file left in the subset of the plurality of communication groups or subgroups to determine a quantity of the reactions, the reactions being user selected from a defined group of reaction types in a user interface associated with the subset of the plurality of communication groups or subgroups; and causing display of an indication of the quantity of the reactions along with the identifier of the first file in a user interface of the one or more of the subset of communication groups or subgroups, the indication of the quantity of the reactions viewable by the subgroup of defined members.

2. The method of claim 1, wherein a first of the plurality of network based services is a unified communications platform and a second of the plurality of network based services is a network-based file sharing service.

3. The method of claim 1, wherein the indication is an icon that changes based upon the quantity of the reactions.

4. The method of claim 3, wherein the icon is animated.

5. The method of claim 1, further comprising:

aggregating a second number of second reactions of a second reaction type to the first file left in the subset of the plurality of communication groups or subgroups to determine a second quantity of the reactions, the second reactions being user selected from the defined group of reaction types; and causing display of a second indication of the second quantity of the second reactions along with the indication of the quantity of the reactions.

6. The method of claim 5, wherein the indication and second indication are animated icons that interact with each other in an animation.

7. The method of claim 6, wherein the animation is created based upon a template.

8. A computing device displaying aggregated file reactions in a user interface, the computing device comprising:
a hardware processor;
a memory, the memory storing instructions, which when executed by the hardware processor, causes the hardware processor to perform operations comprising:
determining identifiers of each of a plurality of files shared within a plurality of communication groups or subgroups of a plurality of network based services, including a first file, the first file associated with and accessible in a subset of the plurality of communication groups or subgroups, the subset including at least two communication groups or subgroups, the communication groups or subgroups within the subset restricted to a subgroup of defined members, and a first of the communication groups or subgroups in the subset including an ability of the subgroup of defined members to communicate with each other using a first communication mode and a second of the communication groups or subgroups in the subset including an ability of the subgroup of defined members to communicate with each other using a second communication mode, the at least two of the plurality of communication groups or subgroups having separate user interface screens, and that at least two of the plurality of communication groups or subgroups each having a plurality of members;

aggregating a number of reactions of a first reaction type to the first file left in the subset of the plurality of communication groups or subgroups to determine a quantity of the reactions, the reactions being user selected from a defined group of reaction types in a user interface associated with the subset of the plurality of communication groups or subgroups; and causing display of an indication of the quantity of the reactions along with the identifier of the first file in a user interface of the one or more of the subset of communication groups or subgroups, the indication of the quantity of the reactions viewable by the subgroup of defined members.

9. The computing device of claim 8, wherein a first of the plurality of network based services is a unified communications platform and a second of the plurality of network based services is a network-based file sharing service.

10. The computing device of claim 8, wherein the indication is an icon that changes based upon the quantity of the reactions.

11. The computing device of claim 10, wherein the icon is animated.

12. The computing device of claim 8, wherein the operations further comprise:

aggregating a second number of second reactions of a second reaction type to the first file left in the subset of the plurality of communication groups or subgroups to determine a second quantity of the reactions, the second reactions being user selected from the defined group of reaction types; and causing display of a second indication of the second quantity of the second reactions along with the indication of the quantity of the reactions.

13. The computing device of claim 12, wherein the indication and second indication are animated icons that interact with each other in an animation.

14. The computing device of claim 13, wherein the animation is created based upon a template.

15. A non-transitory machine-readable storage device, storing instructions that display aggregated file reactions in a user interface, the instructions, when executed by a machine, cause the machine to perform operations comprising:

determining identifiers of each of a plurality of files shared within a plurality of communication groups or subgroups of a plurality of network based services, including a first file, the first file associated with and accessible in a subset of the plurality of communication groups or subgroups, the subset including at least two communication groups or subgroups, the communication groups or subgroups within the subset restricted to a subgroup of defined members, and a first of the communication groups or subgroups in the subset including an ability of the subgroup of defined members to communicate with each other using a first communication mode and a second of the communication groups or subgroups in the subset including an ability of the subgroup of defined members to communicate with each other using a second communication mode, the at least two of the plurality of communication groups or subgroups having separate user interface screens, and that at least two of the plurality of communication groups or subgroups each having a plurality of members;

aggregating a number of reactions of a first reaction type to the first file left in the subset of the plurality of communication groups or subgroups to determine a quantity of the reactions, the reactions being user selected from a defined group of reaction types in a user interface associated with the subset of the plurality of communication groups or subgroups; and causing display of an indication of the quantity of the reactions along with the identifier of the first file in a user interface of the one or more of the subset of communication groups or subgroups, the indication of the quantity of the reactions viewable by the subgroup of defined members.

16. The non-transitory machine-readable storage device of claim 15, wherein a first of the plurality of network based services is a unified communications platform and a second of the plurality of network based services is a network-based file sharing service.

17. The non-transitory machine-readable storage device of claim 15, wherein the indication is an icon that changes based upon the quantity of the reactions.

18. The non-transitory machine-readable storage device of claim 17, wherein the icon is animated.

19. The non-transitory machine-readable storage device of claim 15, wherein the operations further comprise:

aggregating a second number of second reactions of a second reaction type to the first file left in the subset of the plurality of communication groups or subgroups to determine a second quantity of the reactions, the second reactions being user selected from the defined group of reaction types; and causing display of a second indication of the second quantity of the second reactions along with the indication of the quantity of the reactions.

20. The non-transitory machine-readable storage device of claim 15, wherein the indication and second indication are animated icons that interact with each other in an animation.

* * * * *